United States Patent [19]

Tokuhara

[11] Patent Number: 4,536,084

[45] Date of Patent: Aug. 20, 1985

[54] PROJECTION DEVICE

[75] Inventor: Mitsuhiro Tokuhara, Chigasaki, Japan

[73] Assignee: Canon Kabushiki Kaisha, Tokyo, Japan

[21] Appl. No.: 621,692

[22] Filed: Jun. 18, 1984

[30] Foreign Application Priority Data

Jun. 29, 1983 [JP] Japan ................................ 58-119179

[51] Int. Cl.[3] ................................................ G03B 27/52

[52] U.S. Cl. .......................................... 355/55; 355/57

[58] Field of Search ........................ 355/55, 56, 57, 58, 355/60

[56] References Cited

U.S. PATENT DOCUMENTS 3,476,478 11/1969 Rees ........................................ 355/55

3,873,189 3/1975 Whitaker et al. ...................... 355/55

4,116,561 9/1978 Knechtel et al. ...................... 355/57

*Primary Examiner*—Monroe H. Hayes

*Attorney, Agent, or Firm*—Fitzpatrick, Cella, Harper & Scinto

[57] ABSTRACT

A device for slit-scanning the surface of an original and projecting the image of the surface of the original onto a light-receiving medium comprises an imaging optical system for forming the image of the surface of the original on the light-receiving medium. The imaging optical system has means which, in a first condition, has equal imaging magnifications in orthogonal directions, i.e., the widthwise direction of the slit and the lengthwise direction of the slit and is for keeping the surface of the original and the light-receiving medium in an optically conjugate relation and which, in a second condition, has different imaging magnifications in orthogonal directions, i.e., the widthwise direction of the slit and the lengthwise direction of the slit and is for keeping the surface of the original and the light-receiving medium in an optically conjugate relation in both of the directions.

10 Claims, 3 Drawing Figures

PROJECTION DEVICE

BACKGROUND OF THE INVENTION

1. Field of the Invention

This invention relates to a projection device of the slit scanning type such as, for example, a copying apparatus, and in particular to a projection device in which the magnification of a projected image can be varied.

2. Description of the Prior Art

Various methods and apparatuses for varying the imaging magnification of the image of the surface of an original projected onto the surface of a photosensitive medium are known. In these apparatuses, during a magnification change, the imaging magnifications in the lengthwise direction and the widthwise direction of a slit scanning the surface of the original are varied so as to be coincident with each other.

In contrast, in recent years, copying apparatuses in which the longitudinal and transverse imaging magnifications differ from each other, or in other words, the imaging magnifications in the lengthwise direction of the slit and the widthwise direction of the slit can be varied so as not to be coincident with each other have been desired for designers or special usages. For such requirement, in a digital copying apparatus wherein the formation of image is accomplished by scanning a photosensitive medium by a laser beam, an image having different imaging magnifications in longitudinal and transverse directions orthogonal to each other can be obtained by electrically processing the conditioned signal of the laser beam.

SUMMARY OF THE INVENTION

It is an object of the present invention to provide a projection device in which different imaging magnifications are obtained in orthogonal directions.

In the projection device according to the present invention, the above object is achieved by an imaging optical system for projecting the image of an original onto a light-receiving medium. That is, as the imaging optical system, use is made of an optical system which, in a first condition, has equal imaging magnifications in two orthogonal directions and which, in a second condition, have different imaging magnifications in two orthogonal directions and which, in both conditions, the original and the light-receiving medium are optically conjugate in orthogonal planes. As an example of such optical system, in the first condition, a spherical-surface-symmetrical imaging optical system is disposed as a main projection optical system and in addition, an anamorphic auxiliary projection optical system having different imaging magnifications in orthogonal directions is provided and, in the second condition, the auxiliary projection optical system is disposed in the optical path of the main projection optical system, whereby the image of the original is projected onto the light-receiving medium by an anamorphic optical system formed by the main and auxiliary projection optical systems. In this case, the optical path length itself between the original and the light-receiving medium does not vary and therefore, it is necessary that the anamorphic auxiliary projection optical system be provided with optical means for preventing the original and the light-receiving medium from destroying their optically conjugate relation. Another embodiment of said optical system has as the main projection optical system an optical system a part of which is formed by an anamorphic optical element and which as a whole has a rotation-symmetrical power, and by removing a part of the anamorphic optical element from the optical path of the main projection optical system, the main projection optical system can also be used as an anamorphic projection optical system.

Where such a projection optical system in which the imaging magnifications are varied in orthogonal directions in a condition in which they are not equal to each other is applied to a copying apparatus of the slit scanning type, the relative movement speed of the slit scanning the surface of the original or the rotational speed of the photosensitive drum which is a light-receiving medium must be varied in accordance with the imaging magnification in the scanning direction, i.e., the widthwise direction of the slit. When the relative movement speed of the slit is to be varied, the movement speed of the original carriage must be varied or the movement speed of the mirror scanning the stationary original carriage must be varied.

Also, where a non-image forming portion is created on the photosensitive drum by a variation in the imaging magnification in the lengthwise direction of the slit, i.e., the direction orthogonal to the direction of rotation of the photosensitive drum, it is necessary to provide means for illuminating the non-image forming portion as required.

The invention will become more fully apparent from the following detailed description thereof taken in conjunction with the accompanying drawings.

DESCRIPTION OF THE PREFERRED EMBODIMENT

Figure 1:
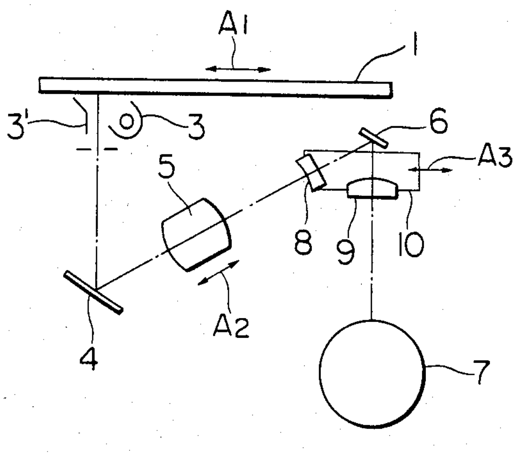
FIG. 1 shows an embodiment of a copying apparatus to which a projection device according to the present invention is applied.

FIG. 1 shows an embodiment of a copying apparatus to which the projection device of the present invention is applied. Reference numeral 1 designates a platen glass supporting an original thereon and movable in the direction of arrow $A_1$, reference numeral 2 denotes a slit, reference numeral 3 designates a light source unit comprising a lamp and a reflector and illuminating the original, reference numeral 3' denotes an auxiliary reflecting mirror, reference numerals 4 and 6 designate mirrors for bending the optical path, and reference numeral 5 denotes a rotation-symmetrical main projection lens system which may be, for example, a variable magnification zoom lens and may be moved in the direction of arrow $A_2$ during a magnification change. Reference numeral 7 designates a photosensitive drum, reference numerals 8 and 9 denote auxiliary lens systems each having an anamorphic imaging characteristic, and reference numeral 10 designates a housing for integrally holding the auxiliary lens systems. The housing 10 is movable in the direction of arrow $A_3$ and by this movement, the auxiliary lens systems can be put into and out of the optical path. The housing 10 is of course so disposed that it does not intercept the optical path when the auxiliary lens systems 8, 9 are not present in the optical path.

In a first condition, the auxiliary lens systems 8, 9 are disposed outside the optical path and the light flux from the original is projected onto the surface of the photosensitive drum by the main projection lens system 5. In this case, the main projection lens system 5 is a rotation-symmetrical system and therefore, the imaging magnifications in the lengthwise direction and the widthwise direction of the slit which are orthogonal to each other are equal to each other. In a second condition, the housing 10 is moved and the auxiliary lens systems 8, 9 are disposed on the optical path, and the light flux from the original is projected onto the surface of the photosensitive drum by the main projection lens system 5 and the auxiliary lens systems 8, 9. In this case, the imaging magnifications in the lengthwise direction and the widthwise direction of the slit differ from each other, but the original and the photosensitive drum are held optically conjugately in the two directions orthogonal to each other.

Figure 2A:
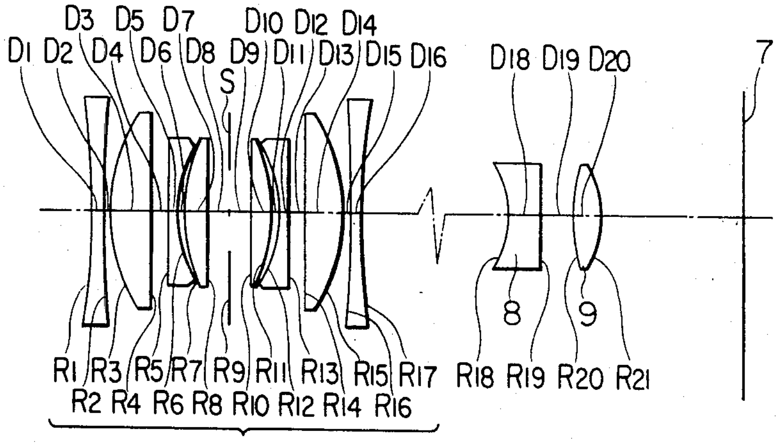
FIGS. 2A and 2B show an embodiment of the imaging optical system of the projection device according to the present invention.
Figure 2B:
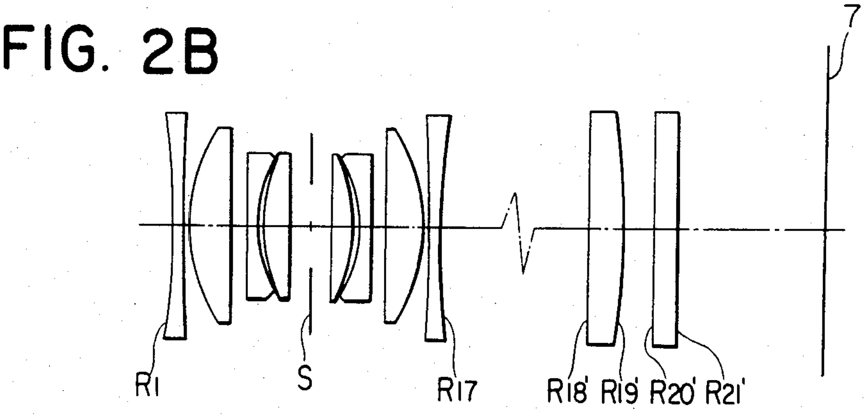

An embodiment of the main projection lens system 5 and the auxiliary lens systems 8, 9 shown in FIG. 1 is shown in FIGS. 2A and 2B. FIG. 2A shows a cross-sectional view of the imaging system in the widthwise direction of the slit, and FIG. 2B shows a cross-sectional view of the imaging system in the lengthwise direction of the slit. The main projection lens system 5 is formed by a zoom lens which is of a symmetrical construction with respect to a stop S, and the lens data thereof will be shown below. In the table below, Ri represents the radius of curvature of the ith surface as counted from the original side, Di represents the on-axis thickness or the on-axis air space between the ith surface and the i+1th surface, νd represents the Abbe number of each lens, and n represents the refractive index of each lens

| Surface No. | Ri | Di | νd | n |
|---|---|---|---|---|
| 1 | −155.556 | 2.000 | 49.4 | 1.570 |
| 2 | 243.852 | $l_1$ (variable) | | |
| 3 | 28.978 | 6.500 | 40.9 | 1.806 |
| 4 | 407.381 | 2.713 | | |
| 5 | 3496.143 | 1.500 | 33.0 | 1.667 |
| 6 | 21.417 | 1.229 | | |
| 7 | 36.589 | 3.000 | 48.5 | 1.697 |
| 8 | 168.806 | $l_2$ (variable) | | |
| 9 (Slit S) | 0 | $l_2$ (variable) | | |
| 10 | −168.806 | 3.000 | 48.5 | 1.697 |
| 11 | −36.589 | 1.229 | | |
| 12 | −21.417 | 1.500 | 33.0 | 1.667 |
| 13 | −3496.143 | 2.713 | | |
| 14 | −407.381 | 6.500 | 40.9 | 1.806 |
| 15 | −28.978 | $l_1$ (variable) | | |
| 16 | −243.852 | 2.000 | 49.4 | 1.570 |
| 17 | 155.556 | | | |

| Projection magnification | $l_1$ | $l_2$ | Focal length | Amount of movement from one-to-one magnification position |
|---|---|---|---|---|
| × 1 | 0.718 | 4.016 | 91.22 | 0 |
| × 1.2 | 1.087 | 3.647 | 90.35 | Toward original: 6.562 |
| × 0.78 | 1.458 | 3.276 | 89.35 | Toward photosensitive medium: 22.488 |
| × 0.669 | 2.825 | 1.909 | 86.72 | Toward photosensitive medium: 35.908 |

Distance between platen 1 and surface R1 in one-to-one magnification position: 153.590
Distance between original surface and photosensitive medium 7: 368.005

During one-to-one magnification imaging, to vary the magnification chiefly in the widthwise direction of the slit, the anamorphic lenses 8 and 9 are disposed between the main projection lens 5 and the photosensitive medium 7 as shown in FIG. 2. Both surfaces of the lens 8 are formed by cylindrical surfaces, and the surface which is adjacent to the surface of the original has a power in a plane in the widthwise direction of the slit and the surface which is adjacent to the photosensitive medium has a power in the lengthwise direction of the slit. The lens 9 is a biconvex cylindrical lens having a power only in a plane in the widthwise direction of the slit. The data of these anamorphic lenses 8 and 9 will be shown below.

| Surface No. | Ri | Di | νd | n |
|---|---|---|---|---|
| 18 | R18 = −15.738 | 5.500 | 57.4 | 1.492 |
| | R18' = 0 | | | |
| 19 | R19 = 0 | 5.333 | | |
| | R19' = −575.695 | | | |
| 20 | R20 = 45.852 | 4.000 | 57.4 | 1.492 |
| | R20' = 0 | | | |
| 21 | R21 = −21.398 | | | |
| | R21' = 0 | | | |

Distance between main projection lens 5 and the auxiliary lens systems: 96.686
Distance between the auxiliary lens systems and photosensitive medium 7: 50.730

The imaging magnification in the widthwise direction of the slit when these auxiliary lens systems 8, 9 have been inserted is 0.67 and the imaging magnification in the lengthwise direction of the slit is 0.95. In this embodiment, in the lengthwise direction of the slit, the magnification hardly varies and accordingly, the curvature of R19' is chiefly for correcting the deviation of the optical path length by the thickness of the auxiliary lens systems when the auxiliary lens systems 8, 9 have been inserted.

The auxiliary lens systems 8, 9 shown in FIG. 2 may desirably comprise a pair of lenses of different powers, such as the lens 8 of negative power disposed on the original surface side and the lens 9 of positive power disposed on the photosensitive medium side, in the cross-section in the widthwise direction of the slit shown in FIG. 2A. That is, if the power of the lens 8 in the lens cross-section shown in FIG. 2A is $\phi_1$ and the power of the lens 9 is $\phi_2$ and the interval between these lenses is e, then the power $\phi$ of the auxiliary lens systems is $$\phi=\phi_1+\phi_2-e\phi_1\phi_2.$$

Thus, if the forward principal point of the optical system formed by $\phi_1$ and $\phi_2$ is H and the rearward principal point of such optical system is H', the distance t from the eighteenth surface (the surface of the lens 8 which is adjacent to the original) to the forward principal point H and the distance t' from the twenty-first surface (the surface of the lens 9 which is adjacent to the lens 9) to the rearward principal point H' are $$t = \frac{e\phi_2}{\phi},\ t' = \frac{-e\phi_1}{\phi}.$$

Thus, if the distance from the forward principal point H to the photosensitive medium is a and the distance from the rearward principal point H' to the photosensitive medium is b and if the values of $\phi_1$, $\phi_2$ and e are determined so as to satisfy $$1/a+1/b=1/\phi,$$

then there is obtained a magnification $$\beta=b/a$$

and the imaging plane also exists on the photosensitive drum 7. In contrast, if the power arrangement of the aforementioned auxiliary lens systems is set to positive and positive or negative and negative, the positions of said principal points will usually become narrow relative to the interval e between the lenses and a very great difference between the distances a and b which is necessary for the magnification cannot be secured.

In the above-described embodiment, the imaging magnification in the widthwise direction of the slit varies and therefore, in a copying apparatus, the movement speed of the original carriage or the movable mirror or the rotational speed of the photosensitive medium must be varied. For example, if the imaging magnification in the widthwise direction of the slit varies from 1 to $\beta$, scanning is effected with the relative speed at which the original is scanned rendered into $1/\beta$ of that during one-to-one magnification without varying the rotational speed of the photosensitive medium or the rotational speed of the photosensitive medium is rendered into $1/\beta$ of that during one to-one magnification without varying the relative speed at which the original is scanned, whereby there is obtained a copy in which the imaging magnification differs between the directions orthogonal to each other.

Where the value of imaging magnification in the widthwise direction of the slit varied by the auxiliary lens systems exists in the area of the continuous variation in imaging magnification by the main projection lens system itself or where the value of the discontinuous variation in imaging magnification by the main projection lens system itself is coincident with the value of the imaging magnification in the widthwise direction of the slit varied by the auxiliary lens systems, any speed changing means for changing the movement speed of the original carriage or the movable mirror or the rotational speed of the rotatable drum by the provision of the auxiliary lens systems is not required, but use can be made of the speed changing means provided correspondingly to the magnification change of the main projection lens system. An example of the means for operating such speed changing means may adopt a construction in which the housing 10, when inserted into the optical path, pushes a switch, and by the signal from this switch, a clutch is selected to a predetermined reduction or enlargement mode by the auxiliary lens systems, whereby copying during a magnification change becomes possible.

Further, in the device shown in FIG. 2, the image can be rotated by rotating the anamorphic auxiliary lens systems 8, 9 with the optical axis as the rotational axis.

What I claim is:

1. A device for slit-scanning the surface of an original and projecting the image of the surface of the original onto a light-receiving medium, said device comprising:

an imaging optical system for forming the image of the surface of the original on said light-receiving medium, said imaging optical system having means which, in a first condition, has equal imaging magnifications in orthogonal directions, i.e., the widthwise direction of the slit and the lengthwise direction of the slit and is for keeping the surface of the original and said light-receiving medium in an optically conjugate relation and which, in a second condition, has different imaging magnifications in orthogonal directions, i.e., the widthwise direction of the slit and the lengthwise direction of the slit and is for keeping the surface of the original and said light-receiving medium in an optically conjugate relation in both of said directions.

2. A device according to claim 1, wherein said imaging optical system comprises a main projection lens system having a spherical-surface-symmetrical power and an auxiliary projection lens system retractably insertable into the optical path leading from the surface of the original to said light-receiving medium.

3. A device according to claim 1, wherein said imaging optical system is a lens system having a spherical-surface-symmetrical power including a plurality of lens elements each having an anamorphic power, and some of said lens elements each having the anamorphic power can be taken out of the optical path.

4. A copying apparatus for projecting the image of the surface of an original onto a photosensitive surface by slit scanning, said copying apparatus comprising:

an imaging optical system for forming the image of the surface of the original on the photosensitive surface, said imaging optical system having means which, in a first condition, has equal imaging magnifications in orthogonal directions, i.e., the widthwise direction of the slit and the lengthwise direction of the slit and is for keeping the surface of the original and the photosensitive surface in an optically conjugate relation and which, in a second condition, has different imaging magnifications in orthogonal directions, i.e., the widthwise direction of the slit and the lengthwise direction of the slit and is for keeping the surface of the original and the photosensitive surface in an optically conjugate relation in both of said directions; and means for adjusting the speed at which the surface of the original is scanned and the movement speed of the photosensitive medium as the imaging magnification in the widthwise direction of the slit varies.

5. A copying apparatus according to claim 4, wherein said imaging optical system comprises a main projection lens system having a spherical-surface-symmetrical power and an auxiliary projection lens system retractably insertable into the optical path leading from the surface of the original to the photosensitive surface.

6. A copying apparatus according to claim 4, wherein said imaging optical system is a lens system having a spherical-surface-symmetrical power including a plurality of lens elements each having an anamorphic power, and some of said lens elements each having the anamorphic power can be taken out of the optical path.

7. A copying apparatus for projecting the image of an original onto the surface of a photosensitive drum by slit scanning, said copying apparatus comprising:

a main projection lens system for projecting the image of said original onto the surface of said photosensitive drum, said lens system comprising a lens system having a spherical-surface-symmetrical power, the image of said original being formed on said photosensitive drum at equal imaging magnifications in both of the widthwise direction of the slit and the lengthwise direction of the slit by said lens system, said lens system being capable of varying the imaging magnification of the image of said original formed on said photosensitive drum; and an auxiliary projection lens system insertable into the optical path between the surface of said original and said photosensitive drum when the imaging magnification of said main projection lens system is one-to-one magnification, said auxiliary projection lens system having different imaging magnifications in the widthwise direction of the slit and the lengthwise direction of the slit, said auxiliary projection lens system, when inserted into the optical path, being adapted to cooperate with said main projection lens system to project onto said photosensitive drum images of different imaging magnifications in the widthwise direction of the slit and the lengthwise direction of the slit, the surface of said original and said photosensitive drum being kept optically conjugate with respect to a lens system constituted by said main and auxiliary projection lens systems, in both of the widthwise direction of the slit and the lengthwise direction of the slit.

8. A copying apparatus according to claim 7, having means for varying the movement speed of an original carriage when said auxiliary projection lens system is inserted.

9. A copying apparatus according to claim 7, having means for varying the speed of a movable mirror scanning the surface of the original when said auxiliary projection lens system is inserted.

10. A copying apparatus according to claim 7, having means for varying the rotational speed of said photosensitive drum when said auxiliary projection lens system is inserted.

* * * * *

UNITED STATES PATENT AND TRADEMARK OFFICE

CERTIFICATE OF CORRECTION

PATENT NO. : 4,536,084

DATED : August 20, 1985

INVENTOR(S) : MITSUHIRO TOKUHARA

It is certified that error appears in the above-identified patent and that said Letters Patent is hereby corrected as shown below:

IN THE DRAWINGS:

Change Fig. 1 by adding --2-- and a lead line to identify the slit described at column 2, line 48 as follows:

FIG. 1

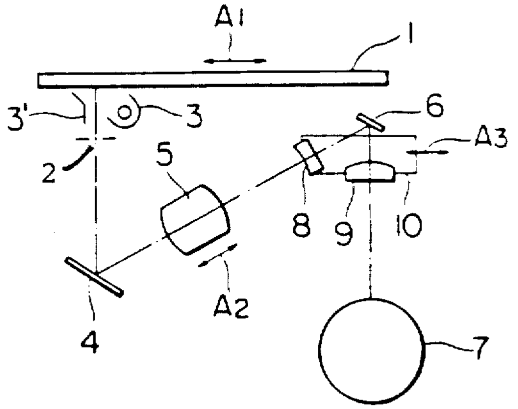

Column 5, line 37 change "one to-one" to --one-to-one--,

Signed and Sealed this

First Day of April 1986

[SEAL]

Attest:

DONALD J. QUIGG

Attesting Officer

Commissioner of Patents and Trademarks